(12) United States Patent
Sakai

(10) Patent No.: US 8,824,585 B2
(45) Date of Patent: Sep. 2, 2014

(54) COMMUNICATION APPARATUS, WIRELESS COMMUNICATION SYSTEM, METHOD FOR APPROXIMATION IN FEEDBACK INFORMATION CALCULATION, AND RECORDING MEDIUM

(75) Inventor: Masahito Sakai, Tokyo (JP)

(73) Assignees: NEC Corporation, Tokyo (JP); NTT DoCoMo, Inc., Tokyo (JP)

( * ) Notice: Subject to any disclaimer, the term of this patent is extended or adjusted under 35 U.S.C. 154(b) by 508 days.

(21) Appl. No.: 13/129,847

(22) PCT Filed: Nov. 27, 2009

(86) PCT No.: PCT/JP2009/070360
§ 371 (c)(1),
(2), (4) Date: May 18, 2011

(87) PCT Pub. No.: WO2010/064695
PCT Pub. Date: Jun. 10, 2010

(65) Prior Publication Data
US 2011/0228835 A1   Sep. 22, 2011

(30) Foreign Application Priority Data
Dec. 2, 2008   (JP) ................. 2008-307660

(51) Int. Cl.
| | |
|---|---|
| H04B 7/02 | (2006.01) |
| H04L 1/02 | (2006.01) |
| H04B 7/04 | (2006.01) |
| H04B 7/06 | (2006.01) |

(52) U.S. Cl.
CPC ............. *H04B 7/0417* (2013.01); *H04B 7/063* (2013.01); *H04B 7/0639* (2013.01); *H04B 7/0634* (2013.01); *H04B 7/0632* (2013.01)
USPC ........................................ 375/267

(58) Field of Classification Search
CPC .... H04B 7/0417; H04B 7/063; H04B 7/0632; H04B 7/0634; H04B 7/0639
USPC .................. 375/219, 259, 260, 267, 316, 227
See application file for complete search history.

(56) References Cited

U.S. PATENT DOCUMENTS

| | | | |
|---|---|---|---|
| 8,155,234 B2 | 4/2012 | Ho et al. | |
| 2007/0098099 A1 * | 5/2007 | Gore et al. | ...... 375/267 |

(Continued)

FOREIGN PATENT DOCUMENTS

| | | |
|---|---|---|
| JP | 2004-128661 A | 4/2004 |
| JP | 2008-526117 A | 7/2008 |

(Continued)

OTHER PUBLICATIONS

QUALCOMM Europe, "Control Channel Issues for DL MIMO," 3GPP TSG-RAN WG1 #44 R1-060455, Feb. 13, 2006, pp. 1-5.

(Continued)

*Primary Examiner* — Betsy Deppe
(74) *Attorney, Agent, or Firm* — Sughrue Mion, PLLC

(57) ABSTRACT

Provided is a communication apparatus which calculates a CQI indicating reception quality of a reception signal in a receiver and feeds back the CQI to a transmitter, the CQI containing information obtained by averaging SNRs of a plurality of subbands, which are generated by dividing a reception band into a predetermined number, in the reception band, the communication apparatus including a CQI/PMI/RI estimation unit directly uses an initial value in a predetermined approximation method as an approximation calculation result obtained by the predetermined approximation method to thereby simplify the calculation, when the predetermined approximation method is used for calculation in the averaging in place of root calculation and when values of the SNRs are high.

17 Claims, 8 Drawing Sheets

(56) References Cited

U.S. PATENT DOCUMENTS

2009/0154588 A1* 6/2009 Chen et al. .................. 375/267
2010/0177653 A1* 7/2010 Luo et al. ..................... 370/252
2010/0220815 A1 9/2010 Ho et al.

FOREIGN PATENT DOCUMENTS

| JP | 2009-527182 A | 7/2009 |
|---|---|---|
| WO | 2006/059566 A1 | 6/2006 |
| WO | 2007/015627 A | 2/2007 |
| WO | 2006/124427 A2 | 11/2007 |
| WO | 2008/126764 A1 | 10/2008 |

OTHER PUBLICATIONS

Nokia, Nokia Siemens Networks, Channel Quality Indicator (CQI) Reporting for LTE MU-MIMO, TSG Ran WG1 meeting #49 R1-072287, May 7, 2007, pp. 1-11.

Samsung, "SU/MU MIMO Feedback with Codebook-based Vector Quantization," 3GPP TSG Ran WG1 Meeting #58bis R1-094322, Oct. 12, 2009, pp. 1-9.

3GPP TS 36.211, "Technical Specification Group Radio Acces Network; Evolved Universal Terrestrial Radio Access; Physical Channels and Modulation," 3rd Generation Partnership Project, May 2008, pp. 1-77, vol. 8, No. 3.

Arib STD-T63-36.213, "Evolved Universal Terrestrial Radio Access (E-UTRA); Physical layer procedures," 3rd Generation Partnership Project TS 36.213, May 2008, pp. 1-45, vol. 8, No. 3.

Kawakami, Ichirio, "Mathematics Introduction Course 8 for Science and Engineering Numerical Calaculation," Iwanami Shoten Publishers, Apr. 2009, pp. 40-51.

Office Action, dated Nov. 20, 2012, issued by the Japanese Patent Office in counterpart Japanese Patent Application No. 2008-307660.

* cited by examiner

|  | Layer Number 1 | Layer Number 2 |
|---|---|---|
| Codebook Index #0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| Codebook Index #1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| Codebook Index #2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| Codebook Index #3 | $\frac{1}{\sqrt{2}}\begin{bmatrix}1\\-j\end{bmatrix}$ | |

FIG. 4

| CQI index | SNR(dB) | modu-lation | Coding rate x 1024 | efficiency |
|---|---|---|---|---|
| 0 | out_of_range | | | |
| 1 | ~SNR_th1 | QPSK | 78 | 0.1523 |
| 2 | SNR_th1~SNR_th2 | QPSK | 120 | 0.2344 |
| 3 | SNR_th2~SNR_th3 | QPSK | 193 | 0.3770 |
| 4 | SNR_th3~SNR_th4 | QPSK | 308 | 0.6016 |
| 5 | SNR_th4~SNR_th5 | QPSK | 449 | 0.8770 |
| 6 | SNR_th5~SNR_th6 | QPSK | 602 | 1.1758 |
| 7 | SNR_th6~SNR_th7 | 16QAM | 378 | 1.4766 |
| 8 | SNR_th7~SNR_th8 | 16QAM | 490 | 1.9141 |
| 9 | SNR_th8~SNR_th9 | 16QAM | 616 | 2.4063 |
| 10 | SNR_th9~SNR_th10 | 64QAM | 466 | 2.7305 |
| 11 | SNR_th10~SNR_th11 | 64QAM | 567 | 3.3223 |
| 12 | SNR_th11~SNR_th12 | 64QAM | 666 | 3.9023 |
| 13 | SNR_th12~SNR_th13 | 64QAM | 772 | 4.5234 |
| 14 | SNR_th13~SNR_th14 | 64QAM | 873 | 5.1152 |
| 15 | SNR_th14~SNR_th15 | 64QAM | 948 | 5.5547 |

FIG. 5

| Mode(PUSCH) | 1-2 | 2-0 | 2-2 | 3-0 | 3-1 |
|---|---|---|---|---|---|
| Wideband CQI | ◎ | ◎ | ◎ | ◎ | ◎ |
| Subband CQI | | | | ◎ | ◎ |
| Best-M CQI | | ◎ | ◎ | | |
| Wideband PMI | ◎ | | ◎ | | ◎ |
| Subband PMI | ◎ | | | | |
| Best-M PMI | | | ◎ | | |
| RI | ◎ | ◎ | ◎ | ◎ | ◎ |
| Index r | | ◎ | ◎ | ◎ | |

| Mode(PUCCH) | 1-0 | 1-1 | 2-0 | 2-1 |
|---|---|---|---|---|
| Wideband CQI | ◎ | ◎ | ◎ | ◎ |
| UE Selected Subband CQI | | | | ◎ |
| Wideband PMI | | ◎ | | ◎ |
| RI | ◎ | ◎ | ◎ | ◎ |
| Index j | | | ◎ | ◎ |

COMMUNICATION APPARATUS, WIRELESS COMMUNICATION SYSTEM, METHOD FOR APPROXIMATION IN FEEDBACK INFORMATION CALCULATION, AND RECORDING MEDIUM

CROSS REFERENCE TO RELATED APPLICATIONS

This application is a National Stage of International Application No. PCT/JP2009/070360 filed Nov. 27, 2009, claiming priority based on Japanese Patent Application No. 2008-307660, filed Dec. 2, 2008, the contents of all of which are incorporated herein by reference in their entirety.

TECHNICAL FIELD

This invention relates to a communication apparatus, a wireless communication system, a method of approximation in feedback information calculation, and a program.

BACKGROUND ART

An OFDM (Orthogonal Frequency Division Multiplexing) system such as LTE (Long Term Evolution) standardized in the 3GPP (3rd Generation Partnership Project) described in Non-patent Document 1 or 2 attracts attention as a next generation communication system. In the OFDM, in order to notify a transmitter of a state of a communication channel, a CQI (Channel Quality Indicator) indicating reception quality in a receiver may be calculated to be fed back to the transmitter.

The transmitter side always controls, based on feedback information, optimal frequency allocation, modulation scheme, and coding rate. Reception characteristics can accordingly be maintained in a good state.

In Patent Document 1, there is proposed that a SNR (Signal to Noise power Ratio) is calculated on a communication capacity basis to be used for calculating a CQI, and also proposed a method for approximation by a log(SNR) in calculation of a communication capacity. However, in this method, there is no specific mention of detailed processing performed by the receiver.

Hereinafter, by taking the case of the LTE as an example, a well-known method for calculating a SNR for a wideband CQI by averaging SNRs of respective subbands in the entire band is described.

In the case of the LTE, there are mainly three pieces of information as feedback information from the receiver to the transmitter: namely, a CQI indicating reception quality in a band; a PMI (Precoding Matrix Indicator) indicating an optimal precoding matrix for the band; and a RI (Rank Indicator) indicating optimal rank information when information is transmitted from the transmitter to the receiver. The precoding means a technology for improving reception signal characteristics by performing, on the transmission side, linear processing suited to a channel state between transmission and reception beforehand.

In Non-patent Document 2 (3GPP TS36.213 v8.3.0), for transmission of feedback information by a PUSCH (Physical Uplink Shared Channel) and PUCCH (Physical Uplink Control Channel), there are defined report modes from respective receivers to transmitters as illustrated in FIG. 10 and FIG. 11. In other words, transverse directions in FIG. 10 and FIG. 11 indicate types of modes. The modes illustrated are described as, for example, 1-0, 1-1, 2-0, 2-1, 2-2, 3-0, and 3-1. On the other hand, longitudinal directions indicate types of feedback information. Illustrated feedback information indicated by a double circle indicates feedback information that must be reported. Hereinafter, each feedback information is described.

A wideband CQI (PMI) illustrated in each of FIGS. 10 and 11 indicates CQI (PMI) information common in the entire band. A subband CQI (PMI) illustrated in FIG. 10 indicates CQI (PMI) information in a certain subband. A best-M CQI illustrated in FIG. 10 indicates information obtained by extracting M better CQIs in order in the entire band. A UE selected subband CQI illustrated in FIG. 11 indicates CQI information in a subband selected by a UE (User Equipment). A best-M PMI illustrated in FIG. 10 indicates PMI information in a subband selected in a best-M CQI report. An index r illustrated in FIG. 10 indicates information of a band selected in a best-M. An index j illustrated in FIG. 11 indicates information of a band selected by the UE.

In general, when the wideband CQI is fed back from the receiver to the transmitter, if only a SNR for each subband is known, the SNRs of the respective subbands must be averaged in the entire band. Accurately calculating an average SNR by this method necessitates calculation of a root. The calculation of the root may become a bottleneck in signal processing. It is therefore desired to introduce an appropriate approximation method when the root is calculated.

Patent Document 1: Japanese Patent Publication No. 2008-526117
Non-patent Document 1: 3GPP, TS 36.211 v8.3.0 (6.3.4 Precoding) May, 2008
Non-patent Document 2: 3GPP, TS 36.213 v8.3.0 (7.2 UE Procedure for reporting channel quality indication (CQI), precoding matrix indicator (PMI) and rank indication (RI)) May, 2008
Non-patent Document 3: "Mathematics Introduction Course 8 for Science and Engineering Numerical Calculation", by Ichiro Kawakami, Published by Iwanami Shoten, Publishers, April, 1989

DISCLOSURE OF THE INVENTION

Problem to be Solved by the Invention

As a general approximation method to calculate the root, a Newton's method can be taken as an example. The Newton's method is a kind of an iteration method for finding an approximate solution of a polynomial equation. The Newton's method is characterized by being faster than a steepest descent method. However, it is known that a convergence rate of the Newton's method greatly depends on an initial value to be set (e.g., described in Non-patent Document 3). Thus, an appropriate initial value must be set according to a problem to which the method is applied. Under the present circumstances, therefore, no setting method for an effective initial value can be established, inhibiting use of the Newton's method for calculating an average SNR. Concerning use of the Newton's method for calculating the average SNR, no method for deriving an appropriate initial value has been proposed.

This invention has been developed under these circumstances, and has an object to provide a communication apparatus, a wireless communication system, a method of approximation in feedback information calculation, and a recording medium having a communication apparatus program recorded thereon, which are capable of setting an initial value for simplifying calculation.

Means to Solve the Problem

This invention provides a communication apparatus calculating a CQI (Channel Quality Indicator) indicating reception quality of a reception signal and feedback the CQI to another communication apparatus, the CQI containing information obtained by averaging SNRs (Signal to Noise power Ratios) of a plurality of subbands, which are generated by dividing a reception band into a predetermined number, in the reception band, the communication apparatus including: a calculation unit which performs calculation in the averaging by using a predetermined approximation method in place of root calculation; and a feedback unit which transmits, as feedback information, information based on a calculation result obtained by the calculation unit to the another communication apparatus, in which the predetermined approximation method is based on a Newton's method, and in which the calculation means calculates an initial value $p_0(L)$ as $p_0(L)=10^{SNRest\_ave(L)/10}$ by using $SNR_{est\_ave}(L)=(1/(KN_f))\Sigma_K\Sigma_f(10\log_{10}SINR(\hat{P}_w, L, f, K))$, where $\hat{P}_w$ denotes a PMI (Precoding Matrix Indicator) common in an entire band indicating that a communication capacity is maximum, L denotes a layer number, f denotes a subcarrier number where a RS (Reference Signal) on a frequency axis is mapped, K denotes a subband number, $SINR(\hat{P}_w, L, f, K)$ denotes an effective SNR, and $SNR_{est\_ave}(L)$ denotes an average SNR.

Further, this invention provides a communication apparatus calculating a CQI indicating reception quality of a reception signal and feedback the CQI to another communication apparatus, the CQI containing information obtained by averaging SNRs of a plurality of subbands, which are generated by dividing a reception band into a predetermined number, in the reception band, the communication apparatus including a calculation unit directly uses an initial value in a predetermined approximation method as an approximation calculation result obtained by the predetermined approximation method when the predetermined approximation method is used for calculation in the averaging in place of root calculation and when values of the SNRs are high.

This invention provides a method of approximation in feedback information calculation, which is to be performed by a communication apparatus calculating a CQI indicating reception quality of a reception signal and feedback the CQI to another communication apparatus, the CQI containing information obtained by averaging SNRs of a plurality of subbands, which are generated by dividing a reception band into a predetermined number, in the reception band, the method including: a calculation step of performing calculation in the averaging by using a predetermined approximation method in place of root calculation; and a step of transmitting information based on a calculation result obtained in the calculation step as feedback information to the another communication apparatus, in which the predetermined approximation method includes a Newton's method, and in which the calculation step includes processing of calculating an initial value $p_0(L)$ as $p_0(L)=10^{SNRest\_ave(L)/10}$ by using $SNR_{est\_ave}(L)=(1/(KN_f))\Sigma_K\Sigma_f(10\log_{10}SINR(\hat{P}_w, L, f, K))$, where $\hat{P}_w$ denotes a PMI common in an entire band indicating that a communication capacity is maximum, L denotes a layer number, f denotes a subcarrier number where a RS on a frequency axis is mapped, K denotes a subband number, $SINR(\hat{P}_w, L, f, K)$ denotes an effective SNR, and $SNR_{est\_ave}(L)$ denotes an average SNR.

Further, this invention provides a method of approximation in feedback information calculation, which is to be performed by a communication apparatus calculating a CQI indicating reception quality of a reception signal and feeding back the CQI to another communication apparatus, the CQI containing information obtained by averaging SNRs of a plurality of subbands, which are generated by dividing a reception band into a predetermined number, in the reception band, the method including a calculation step of directly using, when a predetermined approximation method is used for calculation in the averaging in place of root calculation, in a case where values of the SNRs are high, an initial value in the predetermined approximation method as an approximation calculation result obtained by the predetermined approximation method.

This invention provides a recording medium having a program recorded thereon, the program implementing, when the recording medium is installed in an information processing apparatus, functions of the communication apparatus of this invention for the information processing apparatus.

Effect of the Invention

According to this invention, is possible to provide the communication apparatus, the wireless communication system, the method of approximation in feedback information calculation, and the recording medium, which are capable of setting the initial value for simplifying calculation in feedback information generation.

BRIEF DESCRIPTION OF THE DRAWINGS

FIG. 4 is a diagram illustrating an example of a case where the number of transmission antennas is one or two among codebooks in LTE used for an effective SNR estimation unit illustrated in FIG. 2.

FIG. 5 is a table showing a relationship between a SNR and a CQI index in calculation of the CQI/PMI/RI estimation unit illustrated in FIG. 2.

FIG. 11 is a table showing definitions of report modes from the receiver to the transmitter in a PUCCH of the LTE (wideband CQI, UE selected subband CQI, wideband PMI, RI, and index j).

EMBODYING THE INVENTION

Figure 1:
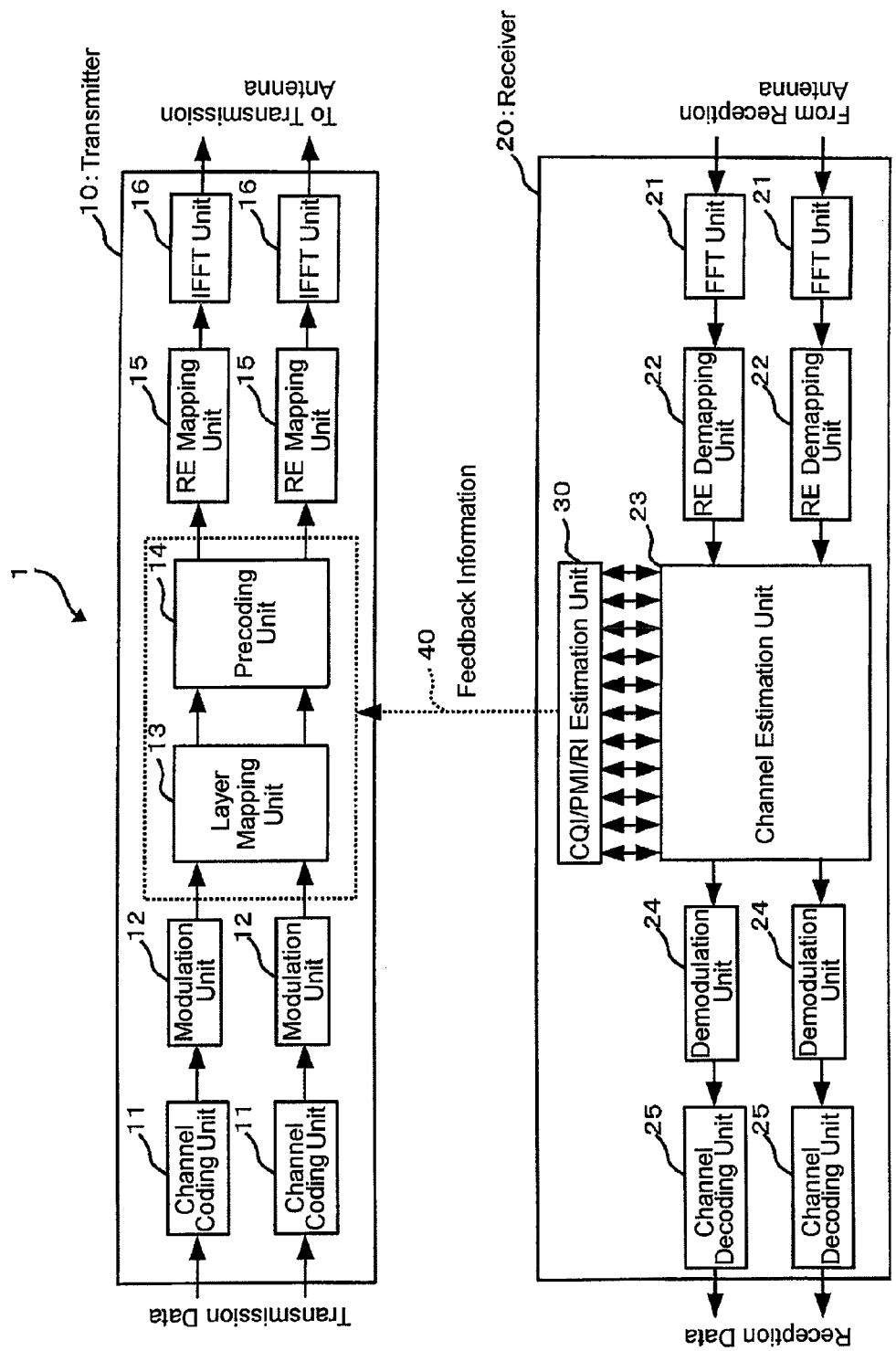
FIG. 1 is a block diagram illustrating a wireless communication system according to a first embodiment of this invention.

Configuration of Wireless Communication System According to First Embodiment of this Invention Referring to FIG. 1, a configuration of a wireless communication system 1 according to a first embodiment of this invention is described. FIG. 1 is a block diagram illustrating the wireless communication system 1. A transmitter 10 that is a communication apparatus includes channel coding units 11, modulation units 12, a layer mapping unit 13, a precoding unit 14, RE (Resource Element) mapping units 15, and IFFT (Inverse Fast Fourier Transform) units 16. A receiver 20 that is a communication apparatus includes FFT (Fast Fourier Transform) units 21, RE demapping units 22, a channel estimation unit 23, demodulation units 24, channel decoding units 25, and a CQI/PMI/RI estimation unit 30.

There are respectively two channel coding units 11, two modulation units 12, two RE mapping units 15, two IFFT units 16, two FFT units 21, two RE demapping units 22, two demodulation units 24, and two channel decoding units 25. It is because different components of two codewords in data are processed in parallel.

Figure 2:
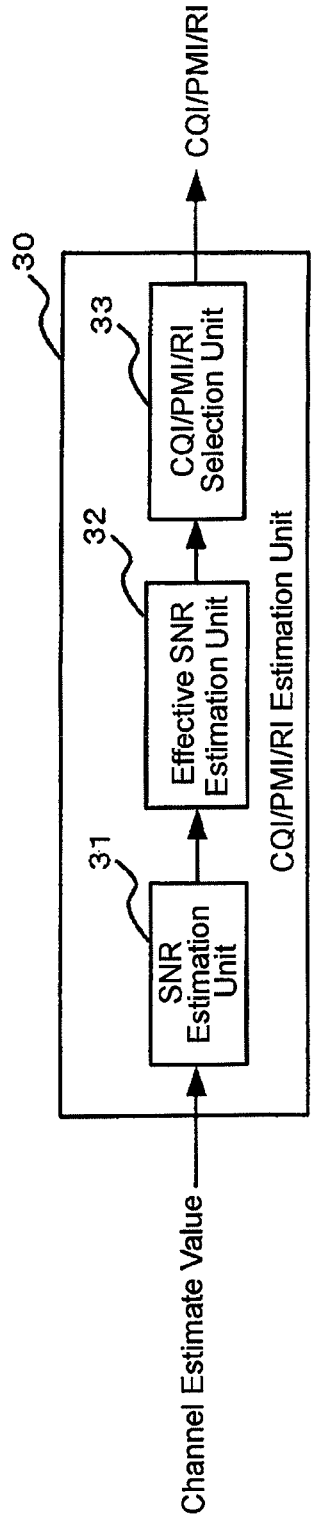
FIG. 2 is a block diagram illustrating a CQI/PMI/RI estimation unit of a communication apparatus (receiver) illustrated in FIG. 1.

FIG. 2 illustrates a configuration example of the CQI/PMI/RI estimation unit 30. The CQI/PMI/RI estimation unit 30 includes a SNR estimation unit 31, an effective SNR estimation unit 32, and a CQI/PMI/RI selection unit 33. The CQI/PMI/RI estimation unit 30 operates as a feedback unit for transmitting feedback information to a calculation unit and another communication apparatus.

The respective units of the transmitter 10 and the receiver 20 may be configured by general-purpose computer apparatus (CPU (Central Processing Unit), DSP (Digital Signal Processor), and microprocessor (microcomputer)) that operate by predetermined software. A control unit for controlling the respective units of the transmitter 10 and the receiver 20 is not illustrated.

Description of Operation of Wireless Communication System According to First Embodiment of this Invention Operations of the transmitter 10 and the receiver 20 of the wireless communication system 1 according to the first embodiment of this invention are described. In the transmitter 10, first, the channel coding unit 11 performs a desired coding operation for transmission data, for example, error detection coding and error correction coding. The modulation unit 12 then maps the transmission data into an I component (in-phase component) and a Q component (quadrature phase component) based on a designated modulation scheme. The layer mapping unit 13 maps the modulated data into a transmission layer based on feedback information 40 from the receiver 20. The precoding unit 14 then multiplies the data mapped into the transmission layer by a designated precoding matrix. Then, the RE mapping unit 15 performs DFT (Discrete Fourier Transform) for the data to map the data into REs on frequency resources. The IFFT unit 16 converts the data into a signal of a time domain, and then the signal is transmitted as a transmission signal from a transmission antenna.

In the receiver 20, on the other hand, the FFT unit 21 first divides the signal received by a reception antenna into data of frequency components by Fourier transform, and then the RE demapping unit 22 demaps the data from the frequency resources. In other words, the RE demapping unit 22 performs processing reverse to that of the RE mapping unit 15. The channel estimation unit 23 estimates a channel estimation matrix indicating a channel state by using an existing signal (Reference Signal) mapped beforehand on the frequency resources. The demodulation unit 24 demodulates the signal from the I component and the Q component to obtain likelihood information based on the channel estimation matrix estimated by the channel estimation unit 23. The channel decoding unit 25 performs error correction decoding and error detection.

The CQI/PMI/RI estimation unit 30 in the receiver 20 estimates CQI/PMI/RI based on the channel estimation matrix estimated by the channel estimation unit 23, and transmits (feeds back) the CQI/PMI/RI as the feedback information 40 to the transmitter 10. The feedback information 40 is reflected in processing at the layer mapping unit 13 and the precoding unit 14 in the transmitter 10.

Figure 3:
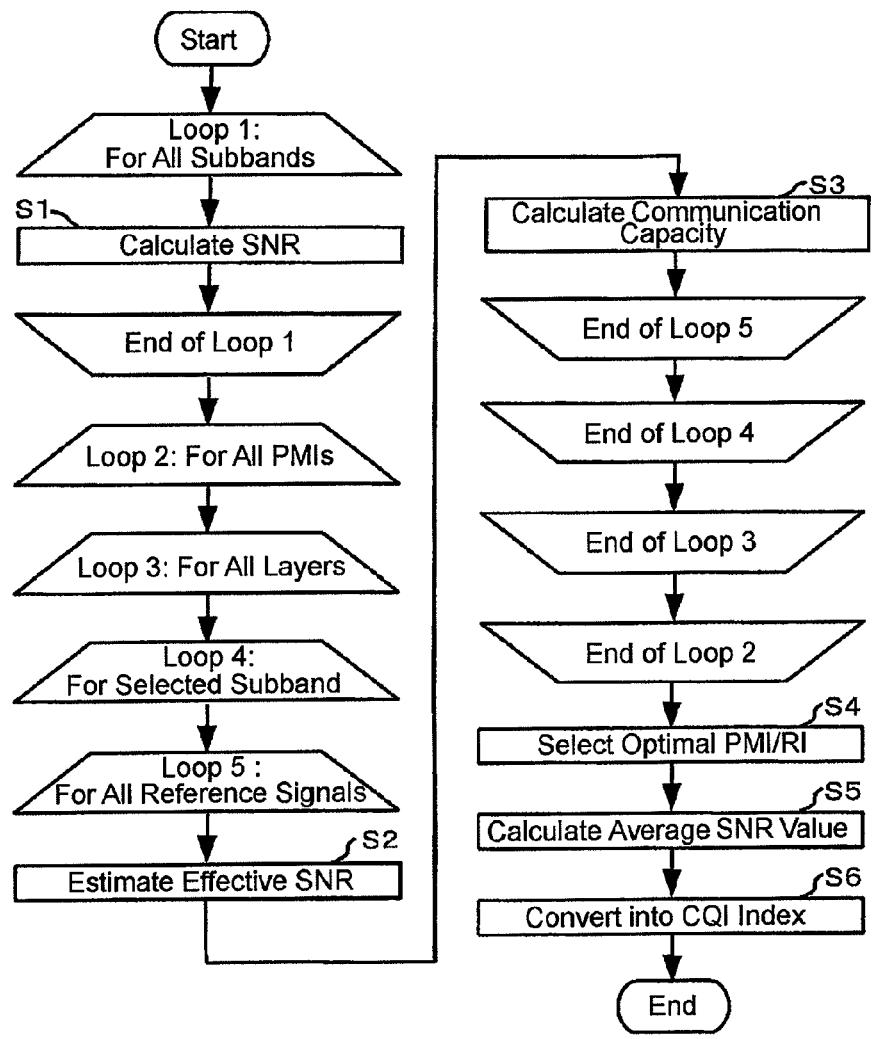
FIG. 3 is a flowchart illustrating a CQI generation procedure of the CQI/PMI/RI estimation unit illustrated in FIG. 2.

Next, referring to FIGS. 2 and 3, an operation of the CQI/PMI/RI estimation unit 30 is described for a case of closed loop spatial multiplexing. The SNR estimation unit 31 first divides the entire band into a predetermined number of small bands. Hereinafter, each divided band is referred to as a subband. Then, the SNR estimation unit 31 calculates a SNR (Signal to Noise power Ratio) for each subband based on the channel estimation matrix calculated by the channel estimation unit 23 (Step S1).

The effective SNR estimation unit 32 estimates an effective SNR indicating a value of a SNR when each PMI indicated by an indicator of a codebook prepared beforehand is applied (Step S2). FIG. 4 illustrates an example of a case where the number of transmission antennas is one or two among codebooks in LTE, which is defined in 3GPP TS36.211 v8.3.0. The effective SNR (=SINR($P_R$,L,f,K)) is calculated by the following expression (1):

$$SINR(P_R, L, f, K) = \frac{SNR(K)}{[SNR(K)^{-1}I_R + V_{P_R}^H H(f)^H H(f) V_{P_R}]_{L,L}^{-1}} - 1 \quad (1)$$

$P_R$ in the expression (1) denotes a PMI indicated by a P-th codebook in the case of a rank R. Similarly, L denotes a layer number, and f denotes a subcarrier number where a RS (Reference Signal) on a frequency axis is mapped. Similarly, K denotes a subband number. Similarly, $I_R$ denotes a unit matrix of R×R. Similarly, $V_{PR}$ denotes a precoding matrix indicated by the P-th codebook in the case of the rank R. Similarly, H(f) denotes a channel estimate value in an f-th subcarrier. [ ]LL denotes a component of an L row and an L column in the matrix.

The CQI/PMI/RI selection unit 33 first calculates, according to a Shannon's theorem, a communication capacity C ($P_R$, L, f, K) of the entire system when each PMI is applied by an expression (2) (Step S3). Steps S2 and S3 are executed for all PMIs, all layers, a selected subband, and all RSs.

$$C(P_R,L,f,K)=\log_2(1+SIN R(P_R,L,f,K)) \quad (2)$$

Then, wideband PMI=P^w and RI=R^ are selected according to an expression (3) so that the calculated communication capacity can be maximum (Step S4):

$$\hat{R}, \hat{P}_w = \underset{R \in \{1,2\}}{\operatorname{argmax}} \max_{P_R \in \Omega_R} \sum_K \sum_f \sum_{l=1}^{R} C(P_R, L, f, K) \quad (3)$$

where $\Omega_R$ denotes a set of all PMIs in the rank R.

Then, an average SNR value $SINR_{wCQI}(L)$ for calculating a wideband CQI indicating channel quality when the selected PMI and the rank are applied is calculated by an expression (4) (Step S5):

$$SINR_{wCQI}(L) = \left[\prod_K \prod_f \left(1 + SINR(\hat{P}_w, L, f, K)\right)\right]^{\frac{1}{K}} - 1 \quad (4)$$

The data is converted from the SNR thus calculated into a CQI index based on a table indicating a relationship between the SNR and the CQI index shown in FIG. 5 (Step S6). The receiver 20 then transmits the obtained CQI index as the feedback information 40 to the transmitter 10. Values of SNR_th1 to SNR_th15 illustrated in FIG. 5 are determined by implementation.

The above-mentioned processing is included in a well-known technology. Hereinafter, a feature of the wireless communication system 1 is described.

In the expression (4), there is processing for calculating a K-th root. However, implementation of this processing is difficult, necessitating use of a certain approximation method. As a method for calculating the K-th root, generally, the Newton's method is often used. As described above, the Newton's method is one of iteration methods for finding a solution to an equation by numerical calculation, and characterized by being faster than a steepest descent method.

$$a = \prod_K \prod_f \left(1 + SINR(\hat{P}_w, L, f, K)\right) \quad (5)$$

K-th root calculation of "a" means finding a solution to a polynomial equation of an expression (6):

$$f(x) = x^K - a = 0 \quad (6)$$

Thus, the K-th root of "a" can be calculated by the following algorithm of the Newton's method. Note that, Input has an initial approximate value $p_0$, an allowable limit of error TOL, and a maximum repeat count $N_0$, and Output has an approximate solution p (or error message):

---
(1) i←L;
(2) while (i≤N_0) do (3)-(6)
(3) p←p_0−f(p_0)/f'(p_0)=p_0−(p_0^K−a)/Kp_0^{K−1}=(1−L/K)P_0+a/Kp_0^{K−1}.
(4) if(|p−p_0|<TOL) then
    OUTPUT (P);
    STOP.
(5) i←i+L
(6) P_0←P.
(7) OUTPUT (Error!);
    STOP.
---

It is known that a convergence speed of the Newton's method greatly depends on setting of an initial value. Setting an initial value $p_0$ to a value as close to an actual solution as possible enables significant improvement of the convergence speed (calculation amount). In the wireless communication system 1, it is presumed that the initial value $p_0$, is set according to the following expression (7):

$$p_0(L) = 10^{SNR_{est\_ave}(L)/10}, \quad (7)$$

$$SNR_{est\_ave}(L) = \frac{1}{KN_f} \sum_K \sum_f \left(10\log_{10} SINR(\hat{P}_w, L, f, K)\right)$$

where Nf denotes the number of subcarriers used for the calculation.

When the initial value $p_0$ is smaller than 1, a value of $a/(Kp_0^{K-1})$ becomes large during the calculation, and hence the value is dispersed without being converged. In this case, as represented by an expression (8), 1 is added to the initial value $p_0$ to prevent the problem:

$$p_0(L) = 10^{SNR_{est\_ave}(L)/10} + 1, \quad (8)$$

$$SNR_{est\_ave}(L) = \frac{1}{KN_f} \sum_K \sum_f \left(10\log_{10} SINR(\hat{P}_w, L, f, K)\right)$$

Figure 6:
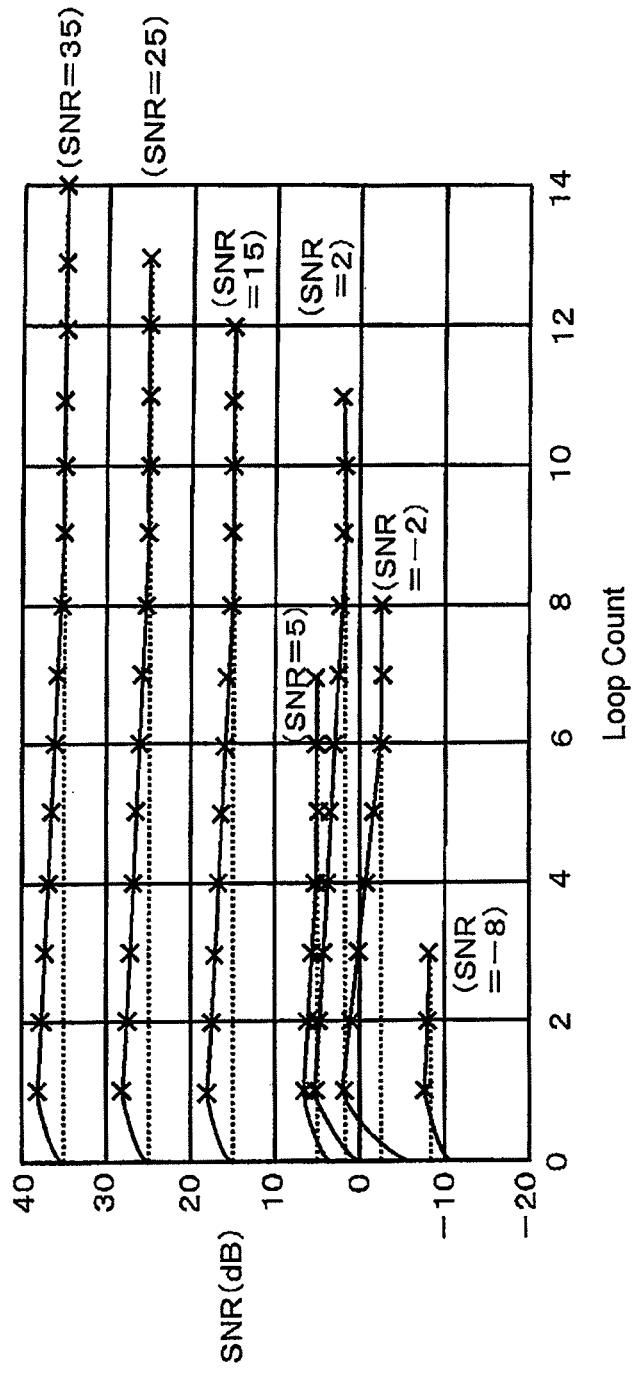
FIG. 6 is a graph showing results of simulating a convergence status by a Newton's method (x axis indicates a loop count, and y axis indicates a SNR).

FIG. 6 shows results of simulating, by the Newton's method, a convergence status by various SNR values when the initial value is set to the above-mentioned value. In the figure, each SNR value is expressed in brackets. An x axis indicates a loop count, and a y axis indicates a SNR. A solid line indicates a value obtained by each loop of the Newton's method, and a dotted line indicates a correct value. A value at a place where a loop count is "0" indicates a set initial value. Setting an appropriate initial value based on the results enables convergence to a correct value by a loop count as few as slightly more than ten.

As can be understood from the value of the initial value shown in FIG. 6, a value set as an initial value is almost equal to an approximate value in the case of a high SNR. The case of the high SNR means a SNR value exceeding approximately 10 dB in FIG. 6.

According to this invention, a calculation amount is reduced from this point. In other words, in the wireless communication system 1, whether to perform calculation by the Newton's method is switched according to the value of the obtained initial value. Accordingly, while securing always sufficient approximation accuracy, a calculation amount at the receiver 20 can be reduced. Hereinafter, this method is referred to as a hybrid method.

In other words, by using the hybrid method, a calculation amount can be reduced compared to the case where the system is constructed to perform calculation by the Newton's method irrespective of a value of a SNR.

Figure 7:
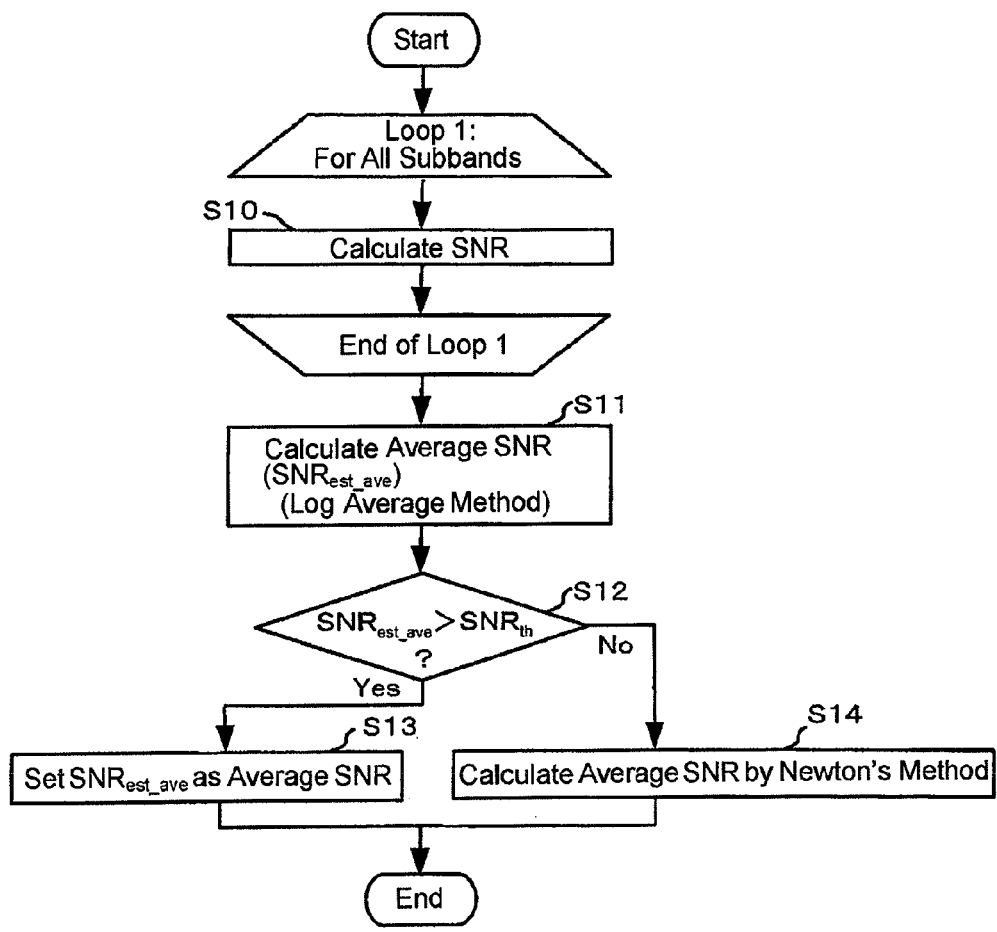
FIG. 7 is a flowchart illustrating a calculation procedure of a hybrid method in the calculation of the CQI/PMI/RI estimation unit illustrated in FIG. 2.

FIG. 7 illustrates, in detail, processing of the hybrid method. First, SNRs are calculated for all subbands (Step S10). Subsequently, the SNR of each subband is converted into a log value, and a simple average is obtained by the expression (7) or the expression (8) to calculate $SNR_{est\_ave}$ (L) (Step S11). Hereinafter, this method is referred to as a log average method.

Then, the $SNR_{est\_ave}(L)$ that is the average SNR obtained by the log average method is compared with a preset threshold value $SNR_{th}$ (Step S12). When the obtained value is larger than the threshold value, the $SNR_{est\_ave}(L)$ obtained by the log average method is output as an average SNR (Step S13). When the obtained value is equal to or smaller than the threshold value, an average SNR is calculated by the Newton's method, and its value is output (Step S14). The comparison of magnitude in Step S12 can be performed by using not ">" but by "≥".

Figure 8:
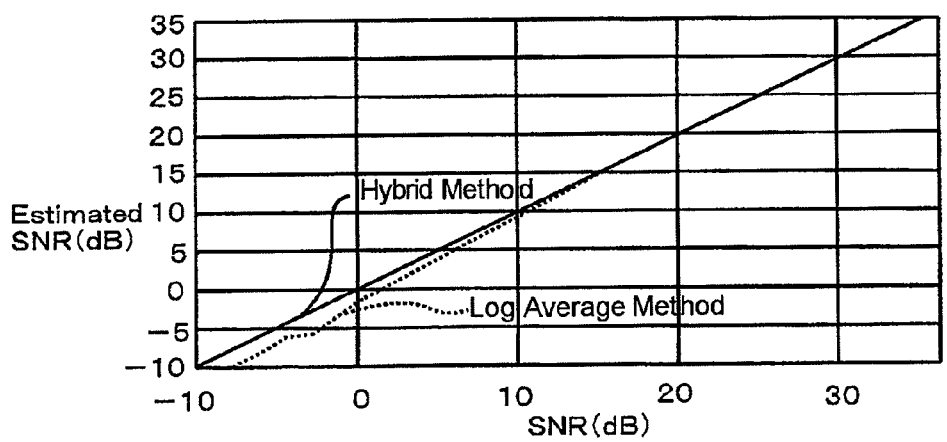
FIG. 8 is a graph showing results of calculating approximate values by the hybrid method, a log average method, and the Newton's method in the calculation of the CQI/PMI/RI estimation unit illustrated in FIG. 2 (x axis indicates an actual SNR, and y axis indicates a SNR calculated by approximation).

FIG. 8 shows a result of comparison of approximate values between the log average method and the hybrid method that is a combination of the log average method and the Newton's method. In FIG. 8, a dotted line indicates a result of calculating approximate values by the log average method, and a solid line indicates a result of calculating approximate values by the hybrid method. An x axis indicates an actual SNR, and a y axis indicates a SNR calculated by approximation. It is accordingly preferred that the actual SNR and the SNR calculated by approximation be proportional to each other.

Referring to the result of the comparison, the result of obtaining the approximate values by the hybrid method shows that the actual SNR and the SNR calculated by the approximation are substantially proportional to each other. It can therefore be understood that, of the two methods according to this invention, while sufficient approximation accuracy is not obtained by the log average method particularly in the case of a low SNR, sufficient approximation accuracy can be obtained by the hybrid method.

The threshold value ($SNR_{th}$) used for the hybrid method is set such that the initial value substantially match a convergence value (approximate value) of the Newton's method. In other words, a point at which the value of the average SNR calculated by the log average method and the value of the average SNR calculated by the Newton's method are within an error range is set as a threshold value. This value is approximately 10 dB.

Figures 9, 10:
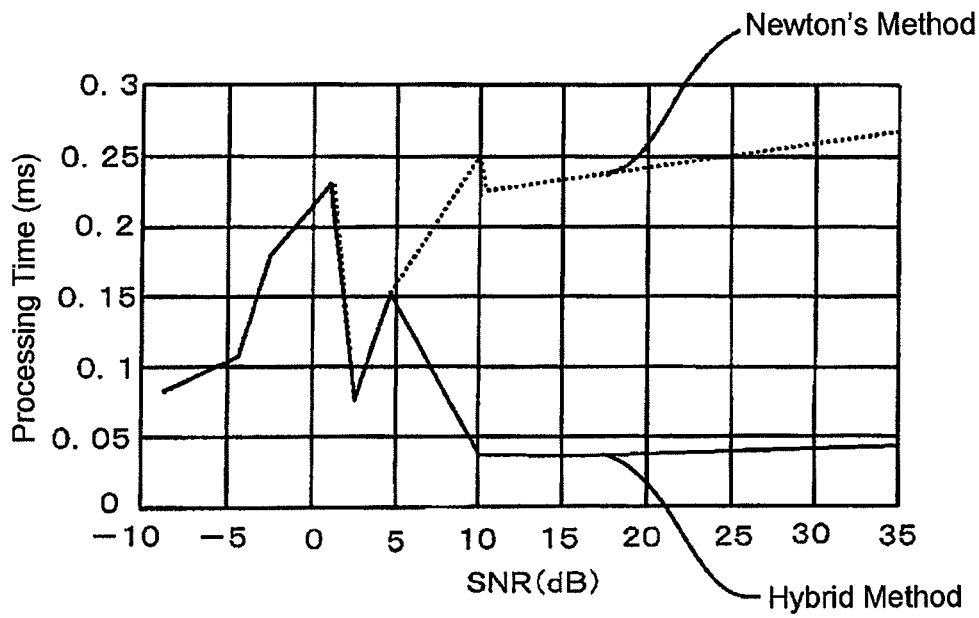
FIG. 9 is a graph showing comparison between the hybrid method and the Newton's method regarding execution periods of time of approximation calculation in a simulation program when a switching threshold value is 10 dB in the calculation of the CQI/PMI/RI estimation unit illustrated in FIG. 2 (x axis indicates a SNR, and y axis indicates processing time).
FIG. 10 is a table showing definitions of report modes from a receiver to a transmitter in a PUSCH of the LTE (wideband CQI, subband CQI, best-M CQI, wideband PMI, subband PMI, best-M PMI, RI, and index r).

FIG. 9 shows an execution period of time of approximation calculation in a simulation program when the switching threshold value $SNR_{th}$ is 10 dB. In FIG. 9, a dotted line indicates an execution period of time of approximation calculation by the Newton's method, and a solid line indicates an execution period of time of approximation calculation by the hybrid method. An x axis indicates an actual SNR, and a y axis indicates the execution period of time of the program. This result shows that in the wireless communication system 1, by using the hybrid method, without reducing approximation accuracy, a calculation time (calculation amount) in the case of a high SNR can be greatly reduced.

Second Embodiment of this Invention

In the first embodiment described above, the Newton's method is used for approximation calculation of the K-th root. However, calculation of (K−1)-th power is still necessary. In order to avoid this calculation, for example, an honor method can be introduced. The honor method is an algorithm for calculating a value at a certain point of a polynomial equation. An approximation calculation algorithm for terms $f(p_0)$ and $f'(p_0)$ when the honor method is introduced is as follows. Input has a degree K and an initial approximation value $p_0$, and Output has $y=f(p_0)$, and $z=f'(p_0)$.

(1) y←L;
    z←L;
(2) for j=K−1, K−2, ..., L do
    y←$p_0$*y;
    z←$p_0$*z+y;
(3) y←$p_0$*y−a;
(4) OUTPUT (y, z);
    STOP.

As this algorithm shows, the introduction of this method enables calculation of the terms $f(p_0)$ and $f'(p_0)$ only by simple loop calculation. As a result, calculation of (K−1)-th power can be avoided.

Embodiment of Program

Next, description is given of an embodiment of a program installed in an information processing apparatus to realize functions of the transmitter 10 and the receiver 20 of the embodiment of this invention for the information processing apparatus. The information processing apparatus is, for example, a general-purpose computer apparatus that includes a CPU, a DSP, or a microprocessor (microcomputer).

For example, the microprocessor includes a memory, a CPU, and an input/output port. The CPU of the microprocessor reads, as a predetermined program, a control program from the memory or the like to execute the program. The microprocessor accordingly realizes, as functions of the respective units of the transmitter 10 and the receiver 20, the channel coding unit 11, the modulation unit 12, the layer mapping unit 13, the precoding unit 14, the RE mapping unit 15, the IFFT unit 16, the FFT unit 21, the RE demapping unit 22, the channel estimation unit 23, the demodulation unit 24, the channel decoding unit 25, and the CQI/PMI/RI estimation unit 30.

The control program executed by the microprocessor may be stored in the memory of the microprocessor before shipment of the transmitter 10 and the receiver 20, or stored in the memory of the microprocessor after shipment of the transmitter 10 and the receiver 20. Further, part of the control program may be stored in the memory or the like of the microprocessor after the shipment of the transmitter 10 and the receiver 20. The control program stored in the memory or the like of the microprocessor after the shipment of the transmitter 10 and the receiver 20 may be obtained, for example, by installing a program stored in a computer-readable recording medium such as a CD-ROM, or by installing a program downloaded via a transmission medium such as the Internet.

Note that, the program according to this embodiment includes not only a program directly executable by the information processing apparatus but also a program executable by installing it in a hard disk. A compressed or encrypted program is also included.

Effects of Embodiment of this Invention

As described above, in the wireless communication system 1, when the SNRs of the respective subbands are averaged in the entire band, and the SNR for the wideband CQI is calculated, by using the log average method, an appropriate initial value used for the Newton's method in which an initial value effective for root calculation is set can be set. In other words, in the wireless communication system 1, when the SNRs of the respective subbands are averaged in the entire band, and the SNR for the wideband CQI is calculated, the Newton's method in which the initial value effective for the root calculation is set can be used. Namely, a calculation amount at the receiver 20 can be reduced. By using the honor method during the calculation based on the Newton's method, the calculation amount can be further reduced.

In the wireless communication system 1, when the SNRs of the respective subbands are averaged in the entire band, and the SNR for the wideband CQI is calculated, by using the hybrid method, an appropriate initial value is set to be compared with the threshold value. In this case, when the SNR exceeds the threshold value, the initial value is directly output as an approximate value. When the SNR is equal to or smaller than the threshold value, approximation calculation is performed by the Newton's method. As a result, while securing sufficient accuracy of an approximate solution, the calculation amount at the receiver 20 can be reduced. By using the honor method, the calculation amount can be further reduced.

Modified Example

Various changes can be made to the embodiments of this invention without departing from the spirit and scope of the invention. For example, the above-mentioned embodiments are directed to communication of a cellular phone utilizing the LTE. However, a similar method can be applied to a cellular phone utilizing FDM or OFDM or a wireless communication system using MIMO (Multiple Input Multiple Output) precoding, such as a wireless LAN. Alternatively, the methods of the embodiments of this invention can be applied to any type of communication system that notifies the transmitter of feedback information based on reception quality at the receiver. In this case, the system is not necessarily a wireless communication system.

Description of Symbols

| | |
|---|---|
| 1 | wireless communication system |
| 10 | transmitter (communication apparatus) |
| 11 | channel coding unit |
| 12 | modulation unit |
| 13 | layer mapping unit |
| 14 | precoding unit |
| 15 | RE mapping unit |
| 16 | IFFT unit |
| 20 | receiver (communication apparatus) |
| 21 | FFT unit |
| 22 | RE demapping unit |
| 23 | channel estimation unit |
| 24 | demodulation unit |
| 25 | channel decoding unit |
| 30 | CQI/PMI/RI estimation unit (calculation unit, feedback unit) |
| 31 | SNR estimation unit |
| 32 | effective SNR estimation unit (calculation unit) |
| 33 | CQI/PMI/RI selection unit |

DESCRIPTION OF SYMBOLS

1 . . . wireless communication system
10 . . . transmitter (communication apparatus)
11 . . . channel coding unit
12 . . . modulation unit
13 . . . layer mapping unit
14 . . . precoding unit
15 . . . RE mapping unit
16 . . . IFFT unit
20 . . . receiver (communication apparatus)
21 . . . FFT unit
22 . . . RE demapping unit
23 . . . channel estimation unit
24 . . . demodulation unit
25 . . . channel decoding unit
30 . . . CQI/PMI/RI estimation unit (calculation unit, feedback unit)
31 . . . SNR estimation unit
32 . . . effective SNR estimation unit (calculation unit)
33 . . . CQI/PMI/RI selection unit This application claims priority from Japanese Patent Application No. 2008-307660, filed on Dec. 2, 2008, the entire disclosure of which is incorporated herein by reference.

The invention claimed is:

1. A communication apparatus calculating a CQI (Channel Quality Indicator) indicating reception quality of a reception signal and feeding back the CQI to another communication apparatus,
the CQI containing information obtained by averaging SNRs (Signal to Noise power Ratios) of a plurality of subbands, which are generated by dividing a reception band into a predetermined number in the reception band, the communication apparatus comprising:
a calculation unit which calculates an average SNR by using a predetermined approximation method; and
a feedback unit which transmits a feedback information of the CQI based on the calculation result obtained by the calculation unit to the another communication apparatus,
wherein the predetermined approximation method is based on a Newton's method, and
wherein the calculation unit calculates an initial value $p_0(L)$ as $p_0(L)=10^{SNRest\_ave(L)/10}$ by using $SNR_{est\_ave}(L)=(1/(KN_f))\Sigma_K\Sigma_f(10\log_{10}SINR(\hat{P}_w, L, f, K))$,
where $\hat{P}_w$ denotes a PMI (Precoding Matrix Indicator) common in an entire band indicating that a communication capacity is maximum, L denotes a layer number, f denotes a subcarrier number where a RS (Reference Signal) on a frequency axis is mapped, K denotes a subband number, $N_f$ denotes a number of subcarriers, $SINR(\hat{P}_w, L, f, K)$ denotes an effective SNR, and $SNR_{est\_ave}(L)$ denotes an average SNR.

2. A communication apparatus according to claim 1, wherein the calculation unit directly uses the initial value in the predetermined approximation method as an approximation calculation result obtained by the predetermined approximation method when a value of the average SNR is higher than a threshold value $SNR_{th}$.

3. A communication apparatus according to claim 1, wherein when the initial value $p_0(L)$ is smaller than "1", the calculation unit uses a value obtained by adding "1" to the initial value $p_0(L)$ as an initial value.

4. A communication apparatus according to claim 1, wherein the calculation unit compares the $SNR_{est\_ave}(L)$ with a threshold value, and directly uses the $SNR_{est\_ave}(L)$ as a calculation result when the $SNR_{est\_ave}(L)$ is equal to or larger than the threshold value.

5. A communication apparatus according to claim 1, wherein the calculation unit uses an honor method as a part of the predetermined approximation method.

6. A method of approximation in feedback information calculation, which is to be performed by a communication apparatus which calculates a CQI (Channel Quality Indicator) indicating reception quality of a reception signal, and which feeds back the CQI to another communication apparatus,
the CQI containing information obtained by averaging SNRs of a plurality of subbands, which are generated by dividing a reception band into a predetermined number, in the reception band,
the method comprising:
a calculation step of calculating an average SNR by using a predetermined approximation method; and
a step of transmitting the feedback information of the CQI based on the calculation result obtained in the calculation step to the another communication apparatus,
wherein the predetermined approximation method comprises a Newton's method, and
wherein the calculation step comprises calculating an initial value $p_0(L)$ as $p_0(L)=10^{SNRest\_ave(L)/10}$ by using $SNR_{est\_ave}(L)=(1/(KN_f))\Sigma_K\Sigma_f(10\log_{10}SINR(\hat{P}_w, L, f, K))$,
where $\hat{P}_w$ denotes a PMI common in an entire band indicating that a communication capacity is maximum, L denotes a layer number, f denotes a subcarrier number where a RS on a frequency axis is mapped, K denotes a subband number, $N_f$ denotes a number of subcarriers, $SINR(\hat{P}_w, L, f, K)$ denotes an effective SNR, and $SNR_{est\_ave}(L)$ denotes an average SNR.

7. A method of approximation in feedback information calculation according to claim 6, wherein the calculation step of directly using an initial value in the predetermined approximation method as an approximation calculation result obtained by the predetermined approximation method when a value of the average SNR is higher than a threshold value $SNR_{th}$.

8. A method of approximation in feedback information calculation according to claim 6, wherein the calculation step comprises using, when the initial value $p_0(L)$ is smaller than "1", a value obtained by adding "1" to the initial value $p_0(L)$ as an initial value.

9. A method of approximation in feedback information calculation according to claim 6, wherein the calculation step comprises comparing the $SNR_{est\_ave}(L)$ with a threshold value, and directly using the $SNR_{est\_ave}(L)$ as a calculation result when the $SNR_{est\_ave}(L)$ is equal to or larger than the threshold value.

10. A method of approximation in feedback information calculation according to claim 9, wherein the threshold value comprises a value in which the initial value substantially matches a convergence value of the Newton's method.

11. A method of approximation in feedback information calculation according to claim 9, wherein the threshold value comprises a value indicating 10 dB.

12. A method of approximation in feedback information calculation according to claim 6, wherein the calculation step comprises using an honor method.

13. A non-transitory recording medium having a program recorded thereon, the program being implemented when the program is installed in a communication apparatus calculating a CQI indicating reception quality of a reception signal and feeding back the CQI to another communication apparatus, the CQI containing information obtained by averaging SNRs (Signal to Noise power Ratios) of a plurality of subbands, which are generated by dividing a reception band into a predetermined number in the reception band, the program implementing:

a calculation unit which calculates an average SNR by using a predetermined approximation method; and a feedback unit which transmits a feedback information of the CQI based on a calculation result obtained by the calculation unit to the another communication apparatus, wherein the calculation unit to calculate the predetermined approximation method by the program is based on a Newton's method, and wherein the calculation unit calculates an initial value $p_0(L)$ as $p_0(L)=10^{SNRest\_ave(L)/10}$ by using $SNR_{est\_ave}(L)=(1/(KN_f))\Sigma_K\Sigma_f(10\log_{10}SINR(\hat{P}_w, L, f, K))$, where $\hat{P}_w$ denotes a PMI (Precoding Matrix Indicator) common in an entire band indicating that a communication capacity is maximum, L denotes a layer number, f denotes a subcarrier number where a RS (Reference Signal) on a frequency axis is mapped, K denotes a subband number, $N_f$ denotes a number of subcarriers, $SINR(\hat{P}_w, L, f, K)$ denotes an effective SNR, and $SNR_{est\_ave}(L)$ denotes an average SNR.

14. A non-transitory recording medium having a program recorded thereon according to claim 13, the program implementing the calculation unit directly uses the initial value $p_0(L)$ in the predetermined approximation method as an approximation calculation result obtained by the predetermined approximation method when a value of the average SNR is higher than a threshold value $SNR_{th}$.

15. A non-transitory recording medium having a program recorded thereon according to claim 13, the program implementing the calculation unit when the initial value $p_0(L)$ is smaller than "1", the calculation unit uses a value obtained by adding "1" to the initial value $p_0(L)$ as an initial value.

16. A non-transitory recording medium having a program recorded thereon according to claim 13, the program implementing the calculation unit to compare the $SNR_{est\_ave}(L)$ with a threshold value, and directly uses the $SNR_{est\_ave}(L)$ as a calculation result when the $SNR_{est\_ave}(L)$ is equal to or larger than the threshold value.

17. A non-transitory recording medium having a program recorded thereon according to claim 13, the program implementing the calculation unit uses an honor method as a part of the predetermined approximation method.

* * * * *